United States Patent
Hemiä et al.

(10) Patent No.: US 6,873,315 B2
(45) Date of Patent: Mar. 29, 2005

(54) USER INTERFACE

(75) Inventors: Teppo Hemiä, Tampere (FI); Jouni Hietamäki, Tampere (FI); Miikka Merilahti, Tampere (FI); Mirka Murtoniemi, Tampere (FI); Juha Nousiainen, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 52 days.

(21) Appl. No.: 09/730,066

(22) Filed: Dec. 5, 2000

(65) Prior Publication Data

US 2001/0003450 A1 Jun. 14, 2001

(30) Foreign Application Priority Data

Dec. 8, 1999 (FI) .............................................. 19992636

(51) Int. Cl.⁷ .............................. G09G 5/00; G09G 5/08
(52) U.S. Cl. ...................... 345/156; 345/157; 345/168
(58) Field of Search .............................. 345/104, 156, 345/157, 87, 168, 172–179; 341/27, 22; 84/477 R; 235/487; 29/339; 361/683; 455/550–556

(56) References Cited

U.S. PATENT DOCUMENTS

| | | | |
|---|---|---|---|
| 5,220,521 A | | 6/1993 | Kikinis .................. 364/709.08 |
| 5,278,779 A | * | 1/1994 | Conway et al. ............. 361/680 |
| 5,616,897 A | | 4/1997 | Weber et al. ................ 200/5 A |
| 5,644,338 A | * | 7/1997 | Bowen ........................ 345/168 |
| 5,706,167 A | | 1/1998 | Lee .............................. 361/680 |
| 5,898,161 A | * | 4/1999 | DeVita et al. .......... 235/462.44 |
| 6,028,591 A | * | 2/2000 | Lueders ....................... 345/104 |
| 6,047,196 A | * | 4/2000 | Makela et al. .............. 455/556 |
| 6,067,704 A | * | 5/2000 | Warren et al. .............. 29/33 G |
| 6,073,027 A | * | 6/2000 | Norman et al. .......... 455/575.4 |
| 6,073,034 A | * | 6/2000 | Jacobsen et al. ............ 455/566 |
| 6,108,197 A | * | 8/2000 | Janik ........................... 361/683 |
| 6,249,672 B1 | * | 6/2001 | Castiel ..................... 455/575.4 |
| 6,259,409 B1 | * | 7/2001 | Fulton et al. ................ 343/702 |
| 6,307,751 B1 | * | 10/2001 | Bodony et al. ............. 361/749 |
| 6,332,084 B1 | * | 12/2001 | Shaanan et al. ............ 455/566 |
| 6,390,373 B1 | * | 5/2002 | Beyer et al. ................ 235/487 |
| 6,397,078 B1 | * | 5/2002 | Kim ......................... 455/556.2 |
| 6,434,371 B1 | * | 8/2002 | Claxton ....................... 455/90 |
| 6,587,675 B1 | * | 7/2003 | Riddiford ................... 455/557 |
| 6,594,142 B2 | * | 7/2003 | Katz ........................... 361/680 |
| 6,774,819 B1 | * | 8/2004 | Falconer ..................... 341/22 |

FOREIGN PATENT DOCUMENTS

| | | |
|---|---|---|
| EP | 0860969 A2 | 8/1998 |
| JP | 2000-132122 | * 12/2000 |
| WO | WO 00/54479 | 9/2000 |

OTHER PUBLICATIONS

Japanese Patent Application No. JP 4178684 with English translation of the Abstract.
Japanese Patent Application No. JP 11272205 with English Translation of the Abstract.
Japanese Patent Application No. JP 11109880 with English Translation of the Abstract.
Japanese Patent Application No. JP 10319879 with English Translation of the Abstract.
EMFi KEYPADS article.
Patent Abstracts of Japan Publication No. JP 2000132122 A.
Patent Abstracts of Japan Publication No. JP 5–109342.
Japanese Patent Abstract No. JP 06164440.

* cited by examiner

*Primary Examiner*—Vijay Shankar
*Assistant Examiner*—Prabodh M. Dharia
(74) *Attorney, Agent, or Firm*—Perman & Green, LLP

(57) ABSTRACT

An electronic input device (MS) has a flexible keyboard (14) for receiving user input and a housing (10) defining a space for accommodating the keyboard. The input device has a compacted state and an extended state. The keyboard adopts a compacted spatial configuration in the compacted state and adopts an extended spatial configuration in the second state. In the compacted state the keyboard is wound on a roll. The input device additionally has a retractable, flexible display having corresponding compacted and extended states so that both the keyboard and the display can be rolled in and out together.

18 Claims, 5 Drawing Sheets

Fig. 1
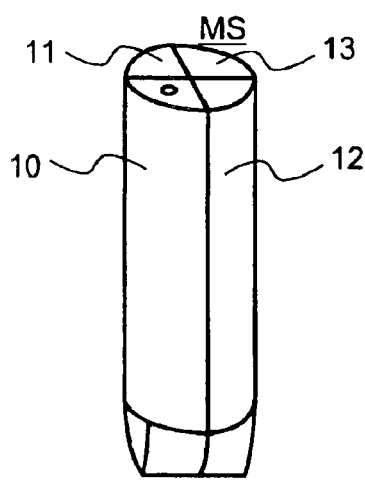
Fig. 2
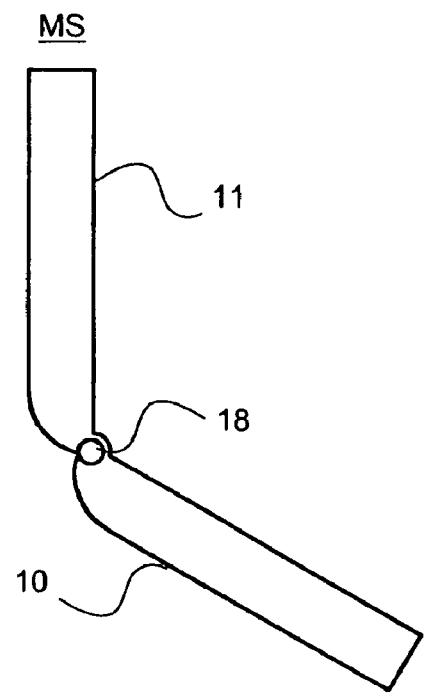
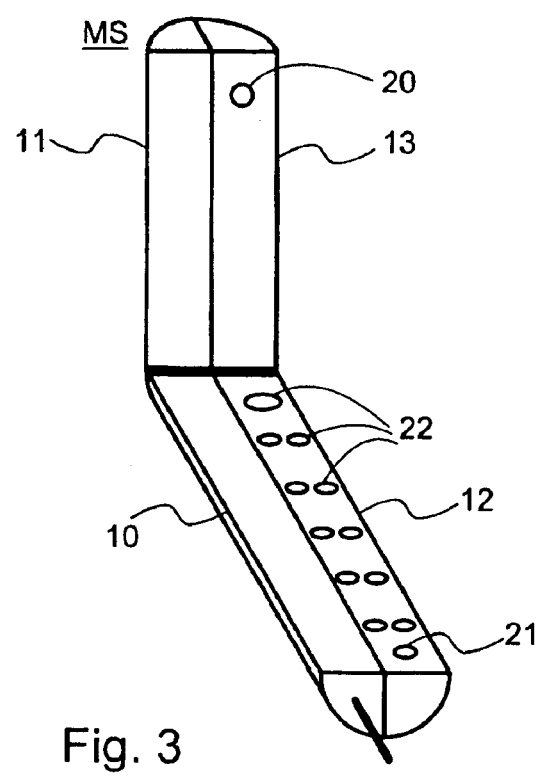
Fig. 3

USER INTERFACE

FIELD OF THE INVENTION

The invention relates to user interfaces, and relates especially to minimising the size of user interfaces.

BACKGROUND OF THE INVENTION

During the last two decades different types of small electronic input devices have been developed, especially for mobile telecommunication. These devices generally have a keypad comprising either a set of buttons typically used on a telephone handset or a small keyboard in the QWERTY format.

It is common in such electronic input devices to provide a display to let a user see information which has been entered via the keypad or keyboard and to provide the user with other information such as received messages, instructions or other information. Developments in electronic and battery technologies have allowed manufacture of ever smaller devices having ever greater functionality. This improvement in functionality has enabled users to interact with electronic input devices in more ways, which has led to more menu options being available. Consequently, electronic input devices generally require a relatively large display and a large number of input keys. It is now common for users to carry their electronic input devices with them most of the time. This increased mobility generally limits the size of electronic input devices to a handheld size. Furthermore, since they are now often carried about, they need to be robust. There is thus a conflict between the need to have a large display and a large keyboard to allow ease of use and the need to have a small portable electronic input device.

In order to keep the size of electronic input devices small, it is known to provide browsing menus to display only a small number of available options and/or information at any one time and to reduce the size of keyboard keys. However, user interfaces of newer and more complicated devices, such as mobile telephones and Personal Digital Assistants, often have a computer-like functionality, and so require a display which is capable of displaying text (having a number of rows) and graphics. QWERTY format keyboards are often provided. An example of such a device is the Nokia® 9000 Communicator. This is in the form of a two-part mobile station comprising a complete QWERTY format keyboard in one part and a display having 640×200 pixels in the other part. The two parts are joined together by a hinge.

SUMMARY OF THE INVENTION

Now a user interface for an electronic input device has been invented, which input device has an input means extractable from a storage space of the device into an extended state and retractable back into the storage space into a retracted state. Thus, the size of the data input device can conveniently be made smaller for transport whilst the input means is protected in the storage space. The electronic input device can subsequently be put into a larger size when the input means is to be used.

According to a first aspect of the invention there is provided an electronic input device comprising:

a flexible input means for receiving user input; and
a housing defining a space for accommodating said input means; characterised in that
said input device has a first state and a second state; wherein
the input means adopts a compacted spatial configuration in the first state and adopts an extended spatial configuration in the second state.

Preferably, the input means has an input surface having touch sensitive areas.

Preferably, the compacted state is non-planar. All or part of the input means may adopt the compacted spatial configuration. In this way, a smaller input area, or no input area at all, is provided to the user.

Preferably, the extended spatial configuration is planar. All or part of the input means may adopt the extended spatial configuration. In this way, the input means provides an input area to a user.

Advantageously, the size of the electronic input device can be reduced, for example by gathering the input means either partially or entirely into the housing, and increased to reveal a convenient large input means, for example by letting out the input means either partially or entirely from the housing.

Preferably, in the second configuration the input means is wound into a roll. Alternatively, it may be folded. In one embodiment, it is a concertina arrangement.

Preferably, said device comprises means for moving said input means between said first and second configurations.

Preferably, said input means is a keyboard. In an embodiment in which the input means is a keyboard its size can be changed considerably thus allowing construction of a small device with full keyboard functionality. It is an advantage of a full keyboard that the user can quickly and easily type text, and yet the input device can be compacted to a convenient small size to be easy to carry with the user during transportation.

Preferably, said input means is a display. Preferably, part of the display is arranged to display a key to implement a soft key the function of which can be varied by software. This has an advantage of combining an input and output means so that the same surface can be used both for displaying information to the user and for reading user input, and thus it is not necessary to provide a separate display at all.

Preferably, the electronic input device comprises:

a flexible output means for outputting information; and
a housing defining a space for accommodating said output means; characterised in that
said input device has a first state and a second state; wherein
the output means adopts a compacted spatial configuration in the first state and adopts an extended spatial configuration in the second state.

Preferably, said flexible output means is a display.

Advantageously, the size of the display can be changed to a high extent. This allows construction of a small device with a large enough display to show a large amount of information at any one time, for example a WWW (World Wide Web) page or e-mail.

Preferably said output means and said input means are arranged so that the input device has two states corresponding to the first and second states of both input means and output means. In the first state both the input means and the output means are compacted and in the second state both the input means and the output means are extended. This provides the advantage of either simultaneous extension or simultaneous compaction of both the input means and the output means.

Preferably, the electronic input device comprises a hinge for foldingly connecting the housing defining the space for accommodating said flexible output means to the housing defining a space for accommodating said input means. This provides an electronic input device, which has a relatively large display, and a relatively large input means and yet can be packed into a compact configuration. This is particularly useful in reducing the size of an electronic input device that is always carried by a user.

Preferably, the electronic input device is a telecommunications device. The telecommunications device may have a data terminal mode in its extended spatial configuration and a telephone mode in its compacted spatial configuration.

Preferably, the electronic input device comprises:

two elements, which are foldable about a hinge between an open configuration and a closed configuration, a speaker located in one element, and a microphone in another element.

The telecommunications device is unfoldable to separate the microphone and the speaker. In this way the speaker may be located conveniently close to a user's mouth and the microphone may be located conveniently close to the user's ear. Advantageously the elements can be folded together to reduce their size of the electronic input device.

Preferably, the electronic input device further comprises:

a stop to prevent the device being opened beyond a certain maximum opening angle, and a means for changing the maximum opening angle when the configuration of the device is changed between the compacted spatial configuration and the extended spatial configuration. This provides different maximum opening angles for when the device is to be used in a telephone mode and when it is to be used in a data terminal mode. For example, it is possible to reduce the opening of the device to a convenient viewing angle for the data terminal mode. In the telephone mode, the mobile station can be further opened to increase the distance of the microphone and the speaker from each other.

BRIEF DESCRIPTION OF THE DRAWINGS

The invention will now be described, by way of example only, with reference to the accompanying drawings, in which:

FIG. 1 shows a perspective view from the front of a mobile station in a transport mode;

FIG. 2 shows a side view of the mobile station of FIG. 1 in a telephone mode;

FIG. 3 shows a perspective view from the front of the mobile station of FIG. 1 in a telephone mode;

DETAILED DESCRIPTION

Figure 4:
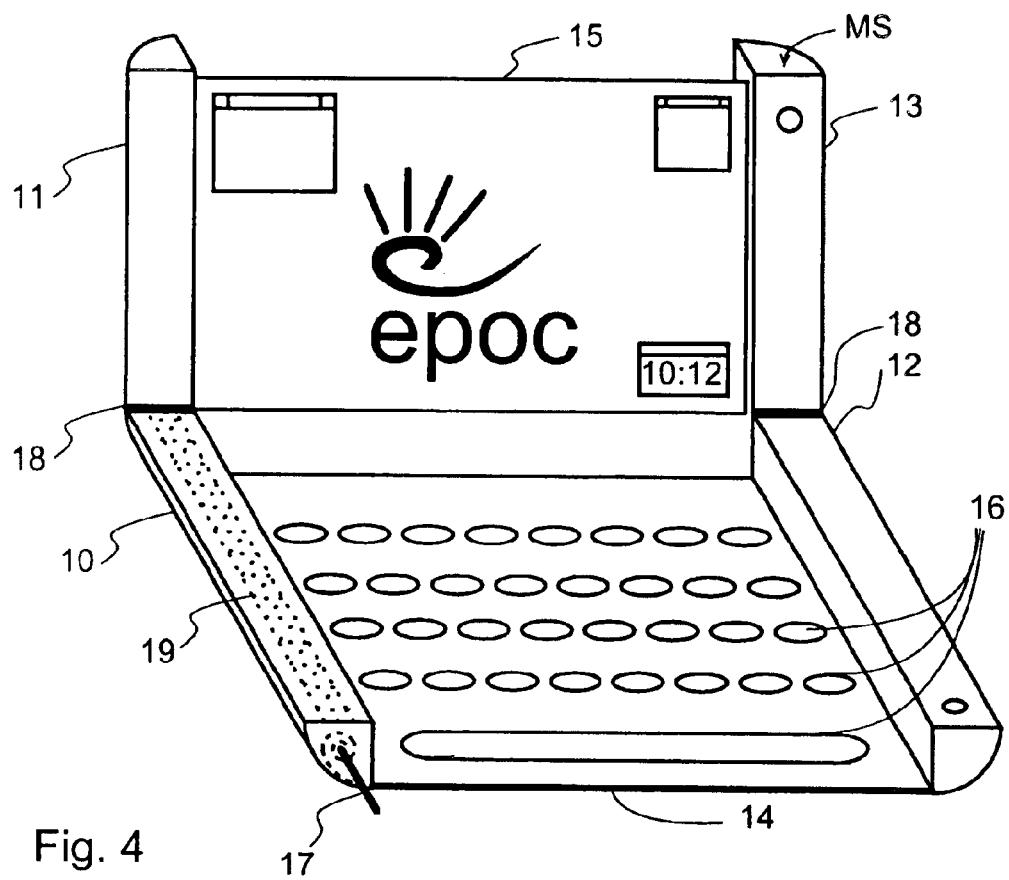
FIG. 4 shows a perspective view from the front of the mobile station of FIG. 1 in a data terminal mode.

FIG. 1 shows a mobile station MS in a retracted configuration, which is suitable for transportation and to be carried by a user, for example in a pocket. It can be seen that in this retracted, or folded-up, configuration the mobile station is basically of a cylindrical shape. The mobile station comprises four elements 10, 11, 12, and 13, which have outwardly facing curved surfaces defining the cylindrical shape. The elements are a lower storage element 10, an upper storage element 11, a battery element 12 and an electronics housing element 13. The battery element 12 contains a battery for operating the mobile station. The electronics housing element 13 contains mobile station electronics to enable the mobile station to be used as, among other things, a mobile telephone and as a data terminal.

Referring now to FIGS. 2 and 3 it can be seen that elements 11 and 10 and elements 13 and 12 are hinged together with hinges 18. The elements 10 and 12 are adjacent to each other and form a first hinged entity. The elements 11 and 13 are correspondingly adjacent to each other and form a second hinged entity. Both of the hinged entities each move about the hinges as a unit. The mobile station is provided with a latch (not shown) to resist it being accidentally opened. Alternatively, friction means may be provided for this purpose.

FIG. 3 shows a perspective view from the front of the mobile station of FIG. 1 in an opened, that is telephone, configuration. The first and second entities have been moved relatively with respect to each other about the hinges 18 and are disposed at an angle of about 115°. This is a comfortable angle for the mobile station to be used as a telephone or as a data terminal as will be described below. The opened configuration reveals a telephone speaker 20 located close to the upper end of the electronics housing element 13 and a microphone 21 located close to the lower end of the battery element 12. A telephone keypad 22 can be seen on a surface of the battery element 12, which surface faces a corresponding surface of the lower storage element 10. In another embodiment of the invention, the user may give verbal input rather than pressing keys with the input being recognised by speech recognition.

Of course, the angle does not have to be exactly 115° but may be arbitrarily chosen. The angle may be either freely adjustable or it may be adjustable in certain steps. There may only be two possible angles at which the mobile station may be fixed: in a completely closed configuration, where the angle is 0°, and in an open configuration, where the angle is typically within a range of 90 to 270 degrees, preferably less than 180 degrees. Alternatively, there may be a third fixed angle so that there are different angles for telephone use and for data terminal use, as described later in this document.

FIG. 4 shows a perspective of the mobile station of FIG. 1 in an extended, data terminal, configuration. Pairs of elements forming each of the first and second hinged entities, that is elements 10 and 12 and elements 11 and 13 are connected to each other by a flexible keyboard 14 and a flexible display 15 respectively. The upper storage element 11 provides a storage space into which the keyboard 14 can be wound and the lower storage element 10 provides a storing space into which the display 15 can be wound. Both the keyboard 14 and the display 15 are arranged to be wound into their respective storage spaces so that the mobile station is in a suitable configuration for transportation or to be used as a telephone. This can be arranged by using any suitable means such as a spring-loaded or an electrically driven roller. In case of electrically driven winding, the battery can be connected to a miniature sized electrical motor in the lower storage element 10 with flexible wires extending beneath the keyboard 14. The elements 13 and 12 are provided with grips, which a user can grasp to pull the elements in respective pairs 10 and 12 and 11 and 13 away from each other. When these pairs are being separated, the keyboard 14 and the display 15 become removed from their storage spaces and unwound partially or to their full extents. The keyboard 14 and the display 15 are electrically coupled to the electronics within the electronics housing element 13. The device also comprises a flexible flat cable (not shown) extending across the hinges 18 to couple the battery, the keypad and the keyboard 14 to the electronics in the electronics housing element 13. Thus the electronics drives the display 15 and receives input from the keyboard 14.

Since the keyboard 14 and the display 15 are flexible and can be wound, they do not need to be sharply folded. Alternatively, the keyboard 14 and the display 15 may be stored in their respective storage spaces in a concertina type arrangement having a suitable mechanism to retract them.

In the extracted configuration, the keyboard 14 and the display 15 are parallel in the direction of their longest side, although they do not necessarily share the same plane.

In one embodiment of the invention the keyboard 14 is a touch pad arrangement for sensing touch by a finger or by a touch pen 17 which is provided for this purpose. In this embodiment, the pen 17 is located in an end of the lower storage element 10. It is convenient to locate the pen 17 on, or adjacent to, an axis about which the keyboard 14 is wound. In this way, the pen 17 may be located inside the keyboard 14 when it is wound. The keyboard 14 is made of an EMFi film, as is known to a person skilled in the art. A set of keys 16 is printed on the keyboard 14 to indicate to a user where to press. In another embodiment, the keys of the keyboard are not printed but instead the keyboard is capable of displaying virtual keys 16, that is soft keys, which are to be pressed. Using soft keys allows dynamic mapping and thus enhances the variability of the keyboard so that it can be adapted to receive input of different kinds in different circumstances. For example, the mobile station can show legends for shortcut keys (such as CTRL A) adjacent to certain keys. These legends may be customised by different applications. In another embodiment, rather than providing a keyboard, a touch pad is provided which can be used as a drawing surface for a drawing application or used as a general input device. For example, it could be used to extend the display area to provide an expanded view to a document or an image.

The display 15 is a paper-like display element. Manufacturers for such display elements comprise E-Ink Inc. & Massachusetts Institute of Technology and Rank Xerox Corporation. Rank Xerox has described one type of paper-like displays called "gyricon": "A gyricon sheet is a thin layer of transparent plastic in which millions of small beads, somewhat like toner particles, are randomly dispersed. The beads, each contained in an oil-filled cavity, are free to rotate within those cavities. The beads are 'bichromal', with hemispheres of contrasting color (e.g. black and white), and charged so they exhibit an electrical dipole. Under the influence of a voltage applied to the surface of the sheet, the beads rotate to present one colored side or the other to the viewer. A pattern of voltages can be applied to the surface in a bit-wise fashion to create images such as text and pictures. The image will persist until new voltage patterns are applied to create new images. ' . . . ' For applications requiring more rapid and direct electronic update, the gyricon material might be packaged with a simple electrode structure on the surface and used more like a traditional display. Gyricon is described at http://www.parc.xerox.com/dhl/projects/epaper/.

The first hinged entity is relatively massive compared to the second hinged entity so that the first entity can lie flat upon a surface when the mobile station is opened. This applies even when the second hinged entity is disposed at an angle to the first hinged entity of more than 90°. In this way, the mobile station is self-supporting when in a data terminal mode. Therefore, the mobile station can be placed on a desk and not topple over. This stability can be provided by locating heavy parts of the mobile station, such as the battery, in the battery housing element 12. Alternatively, it can be provided by locating the majority of the weight in the battery housing element 12 away from the hinges 18 and the majority of the weight in the electronics housing element 13 close to the hinges 18.

The mobile station may also comprise a frame located beneath the keyboard 14 and the display 15. The frame holds the mobile station in the extended configuration. The frame is extendable and retractable. The frame also provides support to the back faces of the keyboard 14 and the display 15 to enable the mobile station to be used on an uneven surface or in the hands of a user. In any case, whether or not a frame is provided, winding of the keyboard 14 and the display 15 can be arranged to occur only in response to user initiation so that the mobile station can be laid on a desk or other such flat surface and stay in the extended configuration.

Figure 5:
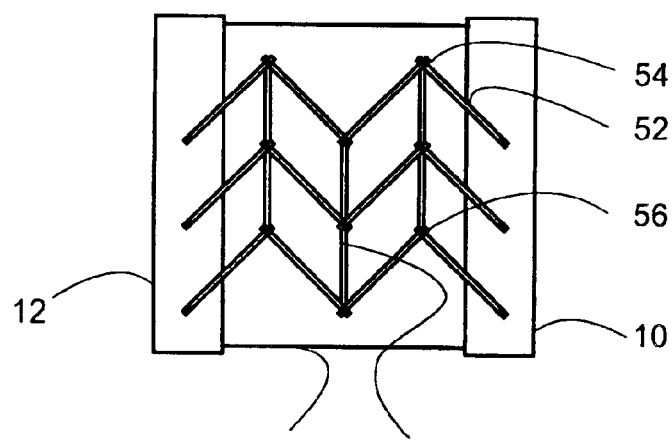
FIG. 5 shows an example of a support mechanism.

FIG. 5 shows an example of a frame provided to support the keyboard. The frame comprises three sets of folding support bars 52. Each set has four support bars which pivot about pivots 56 at both ends. The support bars 52 of each set are maintained in a parallel configuration with corresponding support bars 52 in the other sets. The support bars 52 mechanically connect the battery housing element 12 with the lower storage element 10. The mechanism further comprises three intermediate bars 58, which connect the three sets together. The intermediate bars 58 force corresponding support bars 52 from each set to stay parallel when the mobile station is extended or retracted. In an embodiment in which the support bars 52 comprise conductive material, they can be used electrically to couple the keyboard and battery housing elements 10 and 12. Alternatively, one of these sets can support an electrical lead coupling these elements. A similar frame arrangement can be used to support the display 15.

Figure 6:
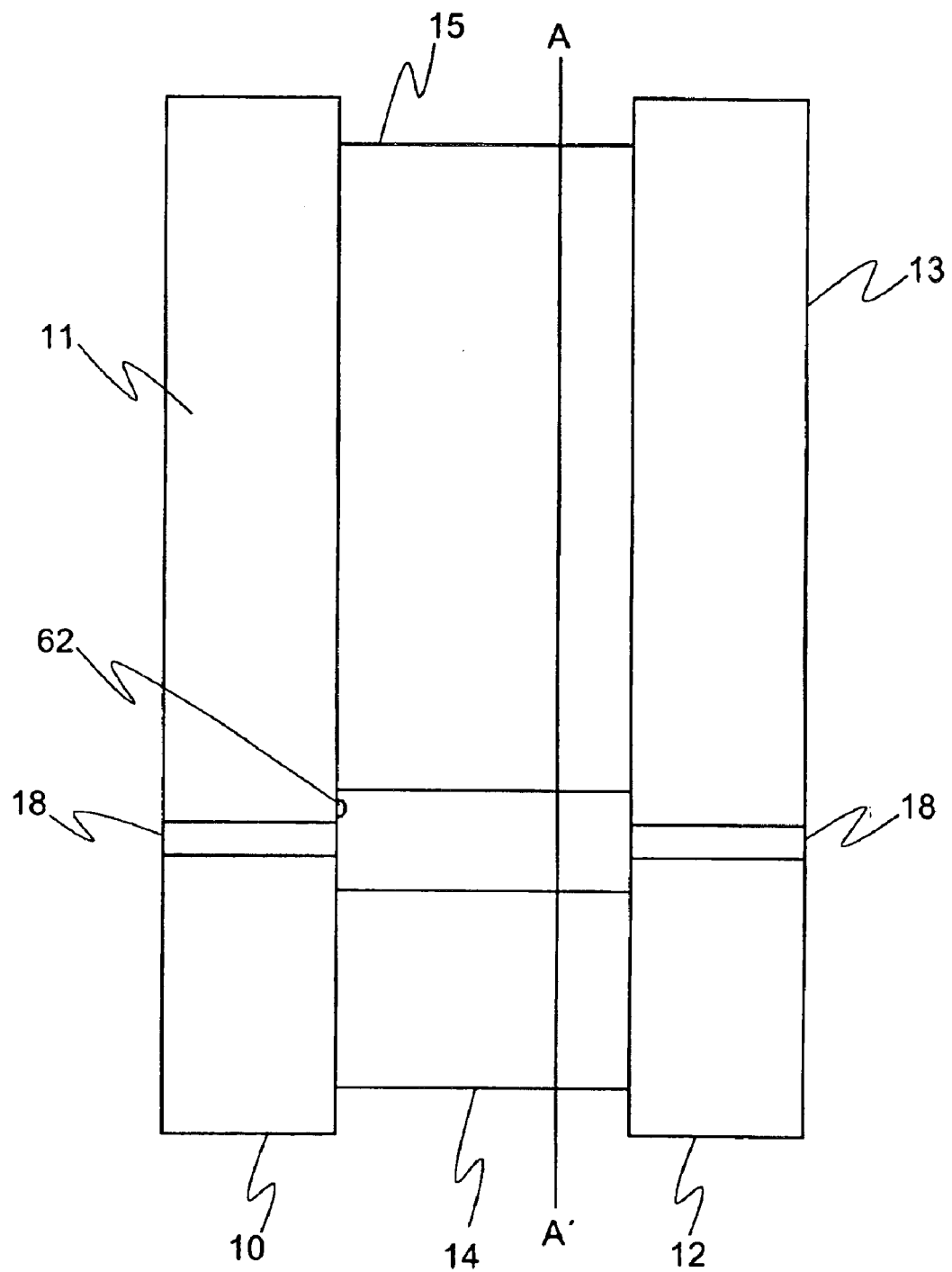
FIG. 6 shows a front view of the mobile station of FIG. 1 in a partially extended mode.

FIG. 6 shows a front view of the mobile station in a partially extended mode. The battery housing element 12 and the electronics housing element 13 are provided with a stop mechanism. The stop mechanism uses a stud 62 provided on the upper storing element 11.

Figure 7:
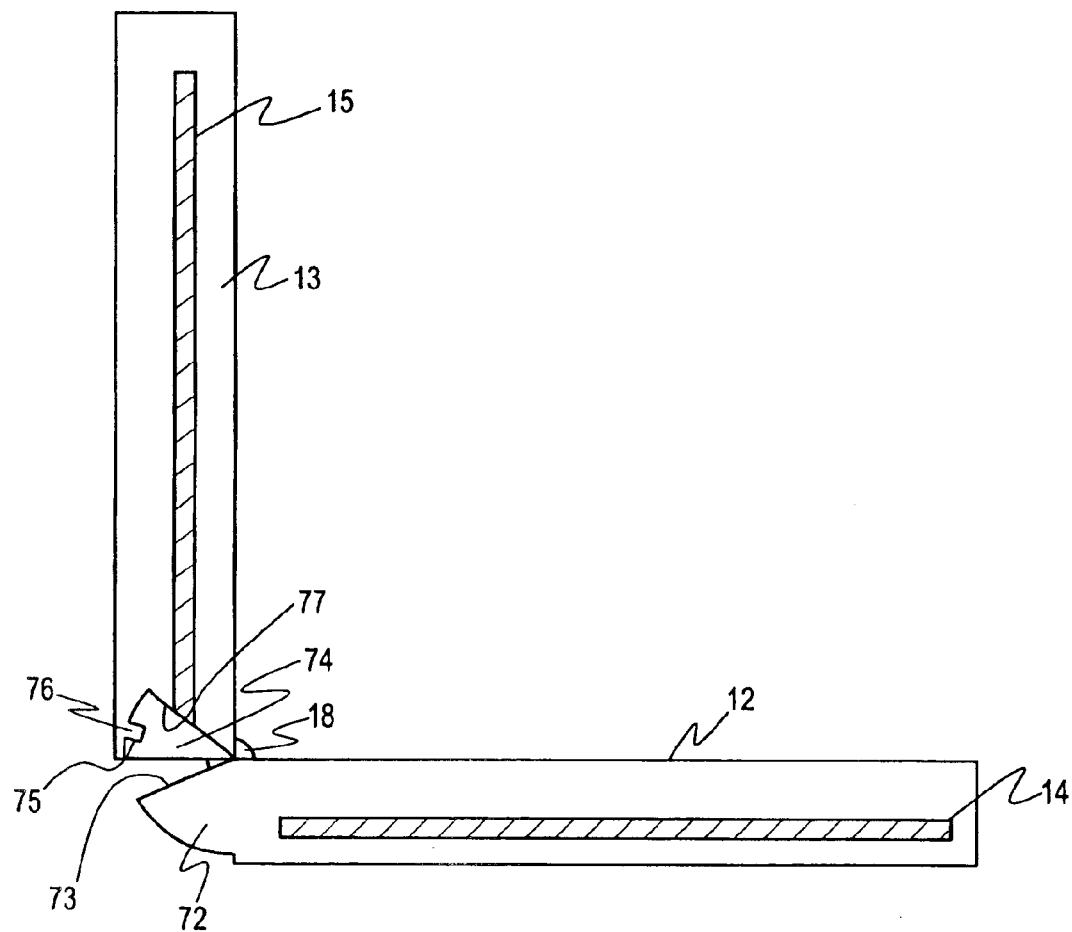
FIG. 7 shows a cross section of the mobile station of FIG. 6 along line A–A'.

FIG. 7 shows a cross section of the view of the mobile station in FIG. 6 along the line A–A'. This embodiment has three fixed opening angles. On a wall facing towards the upper storage element 11, the electronics housing element 13 has a recess 74 on its side at its lower end, close to the hinge 18. The recess has a form of a sector of approximately 45 degrees. The hinged end of the electronics housing element forms the first straight side or radius of the sector.

The battery housing element 12 has a wall that faces towards the lower storage element 10. This wall has an extending flange 72. The flange is basically an extension of the wall going beyond the end of the battery housing element 12. The flange has a sector shape in side view. The flange has an arc extending from the lower side of the battery housing element. The arc extends over an angle of about 60 degrees and terminates at a straight side connecting the arc to the upper side of the battery housing element. The narrow apex of the flange is thus towards the hinge. The flange is aligned in proportion to the hinge so that it enters the recess when the mobile station is opened about the hinges. At a certain first opening angle, the flange fills the entire recess and a leading edge 73 meets the end 77 of the recess.

In order to provide two different opening angles, there is a stop 76. The stop is an extension of the wall of the electronics housing element 13, which faces towards the upper storage element. The stop follows the plane of this wall and extends a few millimetres over the recess 74. The stop and the flange are both aligned to the level of the outer surfaces of the electronics housing element 13 and battery housing element 12. In other words, the stop 76 and the flange 72 occupy a common plane. The flange has two configurations, a relaxed and a bent configuration. In the bent configuration, the flange is slightly bent sideways. The recess is dimensioned deeply enough so that there is space behind the stop for the flange to slide, when the flange is in the bent configuration.

There are three abutment surfaces. The flange 72 has the first abutment surface 73 that is its leading edge. This surface prevents further opening of the mobile station beyond a certain opening angle. The recess 74 has an inner wall (the second direct wall of the sector) defining the second abutment surface 77, which defines the first opening angle. This first opening angle defines the maximum opening angle when the mobile station is being used as a telephone. The stop 76 provides a third abutment surface which faces roughly towards the hinged end of the electronics housing element. When the mobile station is being used as a data terminal that is in the extracted configuration, the stud 62 is far from the flange, the flange moves along the plane of the side walls of the battery and electronics housing elements, and at a certain point engages with the stop.

Figure 8:
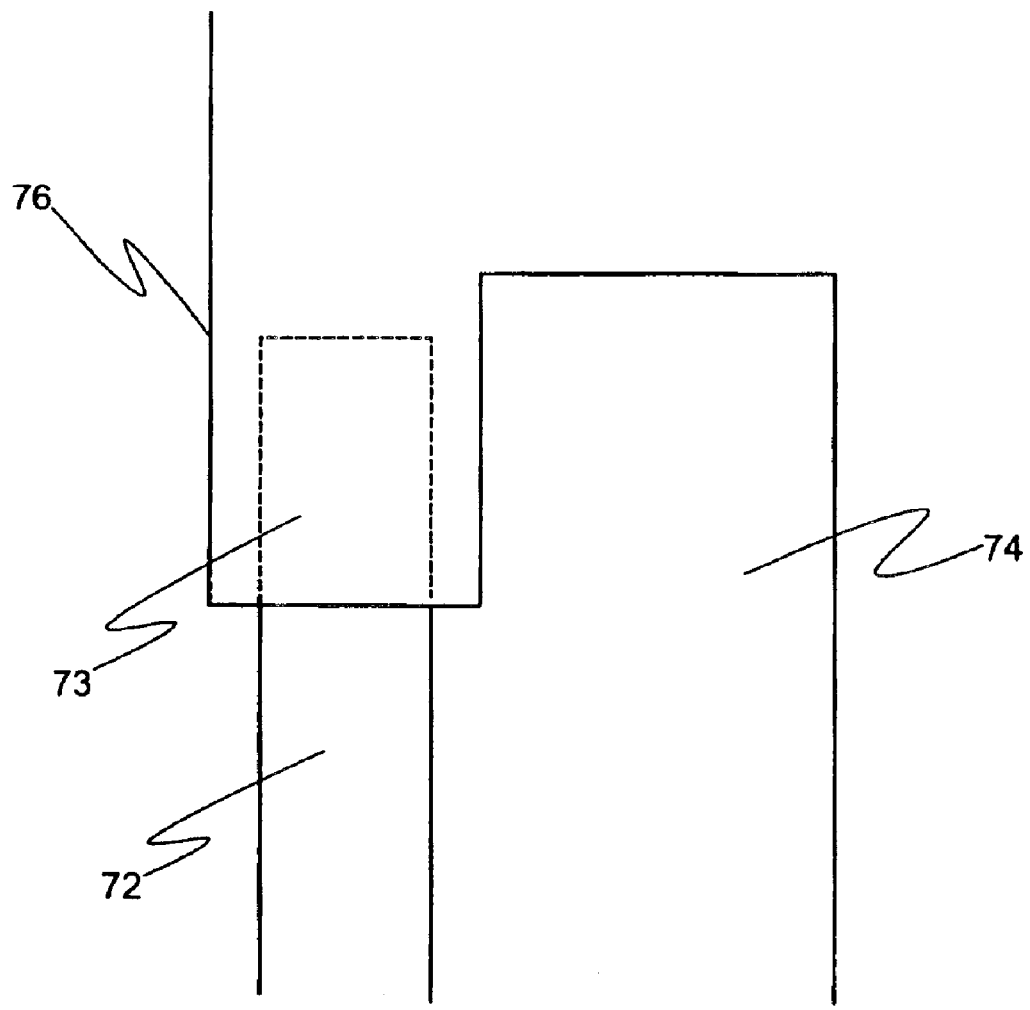
FIG. 8 shows enlarged detail of FIG. 6.

The operation of the stop mechanism will now be described referring to FIGS. 6, 7 and 8. The flange 72 has a relaxed configuration in which it is not pressed upon by the stud 62. This is shown in FIG. 6. In this configuration, when the flange engages the stop 76, further opening movement is prevented, and thus the maximum opening angle for the data terminal mode is defined. Additionally, the flange has a compressed configuration, in which the stud 62 presses the flange 72 into the recess. This happens when the mobile station is set into the telephone mode, that is the upper storage element 11 is brought next to the electronics housing element 13. In this compressed configuration, the first abutment surface 73 of the flange 72 can avoid the stop 76, and the flange slides through the gap. Thus, the mobile station can open until the flange is fully received by the recess 74, that is until the first abutment surface 73 engages the third abutment surface 77 of the recess. When the abutment surfaces are in contact, the battery housing element 12 and the electronics housing element 13 are stopped from opening any further.

The present invention provides several advantages over the prior art. A mobile station according to the invention occupies in its transportation mode a fraction of its fully opened size. In addition, it also has an intermediate configuration provided to enable the mobile station to be used for telephony. The invention can be applied to mobile telephones, personal digital assistants and small laptop computers to provide a screen of a presentation size. Alternatively it can be used for interactive posters in exhibitions, electronic games, user interfaces of various types of home and business electronics like hi-fi-sets, car audio systems, and multimedia devices used, for example, in aeroplanes.

This paper presents the implementation and embodiments of the invention with the help of examples. It is obvious to a person skilled in the art, that the invention is not restricted to details of the embodiments presented above, and that the invention can be implemented in another embodiment without deviating from the characteristics of the invention. The invention was here described using the most complex embodiment as an example, but naturally the invention can also be implemented in a device comprising merely a retracting keyboard without neither display properties nor mobile telephone functionality etc. Thus, the presented embodiments should be considered illustrative, but not restricting. Hence, the possibilities of implementing and using the invention are only restricted by the enclosed patent claims. Consequently, the various options of implementing the invention as determined by the claims, including the equivalent implementations, also belong to the scope of the present invention.

What is claimed is:

1. An electronic input device comprising:
   a flexible and compactable input means for receiving user input; and
   a housing defining a space for accommodating said flexible and compactable input means,
   wherein said electronic input device has a first state, a second state and a third state, and
   wherein the electronic input device adopts a closed configuration in the first state, adopts a partly opened configuration in the second state, and adopts a fully opened configuration in the third state, and
   wherein the flexible and compactable input means adopts a compacted spatial configuration in the first state and in the second state, and adopts an extended spatial configuration in the third state, and
   wherein the electronic input device is configured to be moved from the first state into the second state by an opening movement of a first housing portion of the electronic input device in relation to a second housing portion of the electronic input device in a first direction, and the electronic input device is configured to be moved from the second state into the third state by a pulling movement of a third housing portion of the electronic input device in relation to a fourth housing portion of the electronic input device in a second direction being different that the first direction, and
   wherein in the first state and in the second state the flexible and compactable input means has been retracted into the housing and the functionality of the flexible and compactable input means is unavailable for a user, and
   wherein in the third state the flexible and compactable input means has been extracted from the housing by said pulling movement and the functionality of the flexible and compactable input means is available for a user, and
   wherein in the second state at least part of the functionality of the electronic input device is available for a user, and in the third state the available functionality of the electronic input device is extended.

2. An electronic input device according to claim 1, wherein the flexible and compactable input means has an input surface having touch sensitive areas.

3. An electronic input device according to claim 1, wherein the extended spatial configuration is planar.

4. An electronic input device according to claim 1, wherein the compacted spatial configuration is non-planar.

5. An electronic input device according to claim 1, wherein in the compacted spatial configuration the flexible and compactable input means is wound into a roll.

6. An electronic input device according to claim 1 further comprising means for moving said flexible and compactable input means between said first and second configurations.

7. An electronic input device according to claim 1, wherein said flexible and compactable input means is a keyboard.

8. An electronic input device according to claim 1, wherein said flexible and compactable input means also comprises a display.

9. An electronic input device according to claim 1 further comprising:
  a flexible output means for outputting information; and
  a housing defining a space for accommodating said output means;
  wherein
  said flexible and compactable input device has a first state and a second state; and
  the flexible output means adopts a compacted spatial configuration in the first state and adopts an external spatial configuration in the second state.

10. An electronic input device according to claim 9, wherein said flexible output means is a display.

11. An electronic input device according to claim 9, wherein said flexible output means is arranged parallel with said flexible and compactable input means so that the electronic input device has two states corresponding to the first and second states of both flexible and compactable input means and flexible output means.

12. An electronic input device according to claim 9 further comprising a hinge for foldingly connecting the housing defining the space for accommodating said flexible output means to the housing defining a space for accommodating the flexible and compactable input means.

13. An electronic input device according to claim 1, wherein the electronic input device is a telecommunications device.

14. An electronic input device according to claim 13 further comprising:
  two elements, which are foldable about a hinge between an open configuration and a closed configuration;
  a speaker located in one element, and
  a microphone in another element so that the electronic input device can be unfolded to separate the microphone and the speaker.

15. An electronic input device according to claim 14 further comprising:
  a stop to resist opening the two elements of the input device over a certain maximum opening angle; and
  means for changing the maximum opening angle when the configuration of the electronic input device is changed between the compacted spatial configuration and the extended spatial configuration.

16. A method for manufacturing an electronic input device comprising:
  forming to the electronic input device a housing to define a space for accommodating a flexible and compactable input means; and
  inserting the flexible and compactable input means in a compacted spatial configuration at least partially into said space; and
  configuring the electronic input device so that the electronic input device adopts a closed configuration in a first state of the electronic input device, adopts a partly opened configuration in a second state of the electronic input device, and adopts a fully opened configuration in a third state of the electronic input device, and
  configuring the electronic input device and the flexible and compactable input means so that the flexible and compactable input means adopts a compacted spatial configuration in the first state of the electronic input device and in the second state of the electronic input device, and adopts an extended spatial configuration in the third state of the electronic input device; and
  configuring the electronic input device to be moved from the first state into the second state by an opening movement of a first housing portion of the electronic input device in relation to a second housing portion of the electronic input device in a first direction, and to be moved from the second state into the third state by a pulling movement of a third housing portion of the electronic input device in relation to a fourth housing portion of the electronic input device in a second direction being different that the first direction,
  wherein in the first state and in the second state the flexible and compactable input means has been retracted into the housing and the functionality of the flexible and compactable input means is unavailable for a user, and
  wherein in the third state the flexible and compactable input means has been extracted from the housing by said pulling movement and the functionality of the flexible and compactable input means is available for a user, and
  wherein in the second state at lease part of the functionality of the electronic input device is available for a user, and in the third state the available functionality of the electronic input device is extended.

17. A method for manufacturing of an electronic input device comprising:
  forming to the electronic input device a housing to define a space for accommodating a flexible and compactable input means;
  shaping the flexible and compactable input means into a compacted spatial configuration;
  inserting the flexible and compactable input means at least partially into said space so that the flexible and compactable input means maintains the compacted spatial configuration in a first state of the electronic input device and in a second state of the electronic input device, and adopts an extended spatial configuration in a third state of the electronic input device; and
  configuring the electronic input device so that the electronic input device adopts a closed configuration in the first state, adopts a partly opened configuration in the second state, and adopts a fully opened configuration in the third state, and
  configuring the electronic input device to be moved from the first state into the second state by an opening movement of a first housing portion of the electronic input device in relation to a second housing portion of the electronic input device in a first direction, and to be moved from the second state into the third state by a pulling movement of a third housing portion of the electronic input device in relation to a fourth housing portion of the electronic input device in a second direction being different than the first direction,
  wherein in the first state and in the second state the flexible and compactable input means has been retracted into the housing and the functionality of the flexible and compactable input means is unavailable for a user, and
  wherein in the third state the flexible and compactable input means has been extracted from the housing by said pulling movement and the functionality of the flexible and compactable input means is available for a user, and wherein in the second state at least part of the functionality of the electronic input device is available for a user, and in the third state the available functionality of the electronic input device is extended.

18. A method of an electronic input device presenting a user interface, comprising:

storing a flexible and compactable input means in a compacted spatial configuration within a housing of the electronic input device in a first state of the electronic input device and in a second state of the electronic input device;

extending the flexible and compactable input means out of the housing into an extended spatial configuration in a third state of the electronic input device for receiving user input; and retrieving the flexible and compactable input means again into the compacted spatial configuration within the housing, wherein the electronic input device is configured to adopt a closed configuration in the second state, and to adopt a fully opened configuration in the third state, wherein the electronic input device is configured to be moved from the first state into the second state by an opening movement of a first housing portion of the electronic input device in relation to a second housing portion of the electronic input device in a first direction, and the electronic input device is configured to be moved from the second state into the third state by a pulling movement of a third housing portion of the electronic input device in relation to a fourth housing portion of the electronic input device in a second direction being different than the first direction, and wherein in the second state at least part of the functionality of the electronic input device is available for a user, and in the third state the available functionality of the electronic input device is extended.

* * * * *